(12) United States Patent
Kim et al.

(10) Patent No.: US 9,343,747 B2
(45) Date of Patent: May 17, 2016

(54) MEMBRANE ELECTRODE ASSEMBLY, FUEL CELL COMPRISING THE MEMBRANE ELECTRODE ASSEMBLY, AND METHOD FOR PREPARING AN ELECTRODE CATALYST

(71) Applicant: LG CHEM, LTD., Seoul (KR)

(72) Inventors: Min Suk Kim, Daejeon (KR); Jin Nam Park, Seoul (KR); Hyuk Kim, Seoul (KR)

(73) Assignee: LG CHEM, LTD., Seoul (KR)

( * ) Notice: Subject to any disclaimer, the term of this patent is extended or adjusted under 35 U.S.C. 154(b) by 9 days.

(21) Appl. No.: 14/106,307

(22) Filed: Dec. 13, 2013

(65) Prior Publication Data

US 2014/0106256 A1 Apr. 17, 2014

Related U.S. Application Data

(62) Division of application No. 11/302,389, filed on Dec. 14, 2005, now abandoned.

(30) Foreign Application Priority Data

Dec. 17, 2004 (KR) ........................ 10-2004-0107698

(51) Int. Cl.
- *H01M 6/00* (2006.01)
- *H01M 4/88* (2006.01)
- *H01M 4/92* (2006.01)
- *H01M 8/10* (2016.01)

(52) U.S. Cl.
CPC ............ *H01M 4/8825* (2013.01); *H01M 4/921* (2013.01); *H01M 4/925* (2013.01); *H01M 4/926* (2013.01); *H01M 4/8828* (2013.01); *H01M 2008/1095* (2013.01); *Y02E 60/50* (2013.01)

(58) Field of Classification Search
CPC . H01M 4/8825; H01M 4/8828; H01M 4/921; H01M 4/925; H01M 4/8842; H01M 4/885; H01M 4/881; H01M 4/8803; H01M 4/0289; H01M 4/0271; H01M 4/926; H01M 4/923; H01M 2008/1095; Y02E 60/50
See application file for complete search history.

(56) References Cited

U.S. PATENT DOCUMENTS

| | | | |
|---|---|---|---|
| 2003/0104936 A1 | 6/2003 | Mao et al. | |
| 2003/0230029 A1* | 12/2003 | Ruettinger et al. | ......... 48/197 R |
| 2004/0038808 A1 | 2/2004 | Hampden-Smith et al. | |
| 2004/0121221 A1 | 6/2004 | Suzuki et al. | |
| 2004/0161850 A1 | 8/2004 | Kato et al. | |
| 2004/0197638 A1 | 10/2004 | McElrath et al. | |

FOREIGN PATENT DOCUMENTS

| | | |
|---|---|---|
| CN | 1329372 | 1/2002 |
| CN | 1545744 A | 11/2004 |
| EP | 1164651 A1 | 12/2001 |
| JP | 8117598 | 5/1996 |
| JP | 10334925 | 12/1998 |
| JP | 2000012043 | 1/2000 |
| JP | 2001325964 | 11/2001 |
| JP | 2002184414 | 6/2002 |
| JP | 200479420 A | 3/2004 |
| JP | 10334925 | 7/2005 |
| JP | 2005190726 | 7/2005 |
| JP | 2008511098 | 4/2008 |
| KR | 2001004405 A | 1/2001 |
| KR | 1020010004405 A | 1/2001 |
| KR | 20020095291 A | 12/2002 |
| KR | 1020020095291 A | 12/2002 |
| WO | 03083963 A2 | 10/2003 |
| WO | 2005081215 A1 | 9/2005 |

* cited by examiner

*Primary Examiner* — Raymond Alejandro
(74) *Attorney, Agent, or Firm* — Dentons US LLP

(57) ABSTRACT

Disclosed is an electrode catalyst comprising: (a) a support with a specific surface area of at least 1200 m$^2$/g; and (b) platinum or platinum-containing alloy particles on the support, wherein the platinum is supported on the electrode catalyst in an amount of 56~90 wt % based on the total weight of the electrode catalyst. A membrane electrode assembly (MEA) comprising the electrode catalyst and a fuel cell using the MEA are also disclosed. The electrode catalyst comprises platinum or platinum-containing alloy particles highly dispersed on a support with a large surface area in an amount of 56 wt % or more, and thus has an extended catalytically active region, resulting in improvement in the quality of a fuel cell.

3 Claims, 2 Drawing Sheets

MEMBRANE ELECTRODE ASSEMBLY, FUEL CELL COMPRISING THE MEMBRANE ELECTRODE ASSEMBLY, AND METHOD FOR PREPARING AN ELECTRODE CATALYST

This application is a divisional of U.S. application Ser. No. 11/302,389, filed on Dec. 14, 2005, now abandoned, which claims priority to Korea Patent Application No. 10-2004-0107698, filed on Dec. 17, 2004, all of which are incorporated herein by reference in their entirety.

TECHNICAL FIELD

The present invention relates to a catalyst for an anode or cathode, which contains platinum as a catalytic substance for a fuel cell, a membrane electrode assembly comprising the electrode catalyst, and a fuel cell comprising the membrane electrode assembly. More particularly, the present invention relates to an electrode catalyst that has an extended active region by virtue of the platinum particles highly dispersed and precipitated on a support having a large surface area, a membrane electrode assembly comprising the electrode catalyst, and a fuel cell that comprises the membrane electrode assembly, and thus has improved quality by solving the problem of delayed reduction of oxygen, occurring in a conventional cathode.

BACKGROUND ART

Fuel cells are power generation systems that convert chemical energy generated from oxidation of fuel into electric energy. Fuel cells have a higher efficiency compared to other internal combustion engines, and are substantially free from emission of pollutants. Therefore, fuel cells have become the focus of attention as alternative energy technology.

In general, a fuel cell comprises an anode, a cathode and an electrolyte. Fuel cells may be classified into low-temperature fuel cells and high-temperature fuel cells depending on the electrolyte used therein. In the case of a low temperature fuel cell that operates at a temperature of 300° C. or lower, the fuel cell is necessary to show high catalyst reactivity and ion permeability at low temperature in order to obtain a desired level of energy. Therefore, an electrode catalyst as well as an electrolyte is a critical factor determining the overall quality of a fuel cell. Currently, most electrode catalysts for low temperature fuel cells are comprised of Pt/support (i.e. platinum loaded on a support), or non-supported platinum black. Herein, it is important to reduce the amount of platinum or to maximize the activity of platinum per unit weight, because of the high cost of platinum. To achieve this, it is necessary to increase the active region of a catalyst by controlling the size of the platinum particles carried on a support to a nano-scaled size. Meanwhile, when preparing a membrane electrode assembly, degradation of the quality caused by degradation of mass diffusion decreases as the thickness of a catalyst layer decreases. Therefore, it is necessary to reduce the amount of a support, so that a highly supported catalyst can be obtained. Further, it is necessary to provide a highly dispersed Pt/support catalyst comprising Pt microparticles.

Conventional methods for preparing Pt/support powder by loading Pt particles on a support are broadly classified into a precipitation method and a colloidal method.

The precipitation method is carried out in a liquid phase for the most part and is not significantly affected by process parameters. Therefore, the precipitation method is relatively simple, and is readily amenable to scale-up. However, it has the disadvantages of non-uniform dispersion of platinum particles and a relatively large size of particles. On the contrary, according to the colloid method, it is possible to obtain fine platinum particles with a narrow size distribution of 1.5-3 nm and to accomplish uniform dispersion of particles, when platinum is supported in an amount of 20~40 wt % based on the total weight. However, the colloid method has the following problems: platinum particle size increases rapidly as the amount of Pt increases to 50 wt % or more; an additional hydrogen reduction step is required; and water should be introduced at quantities of 10 times or greater than the amount needed for the precipitation method. Therefore, an optimized method for preparing an electrode catalyst is needed, so as to simplify the processing steps and to obtain fine Pt particles.

Meanwhile, most supports developed for use in electrode catalysts have a specific surface area of 300 $m^2/g$ or less. Even in the case of a high-surface area support used in commercially available catalysts, the support generally has a surface are of 800 $m^2/g$ or less. When preparing an electrode catalyst by using the above support, the particle size of Pt decreases merely to a limited level, and Pt particles cannot be dispersed uniformly on the support surface. As a result, there is a serious problem in that the active region of the Pt catalyst cannot be increased sufficiently.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Figure 1:
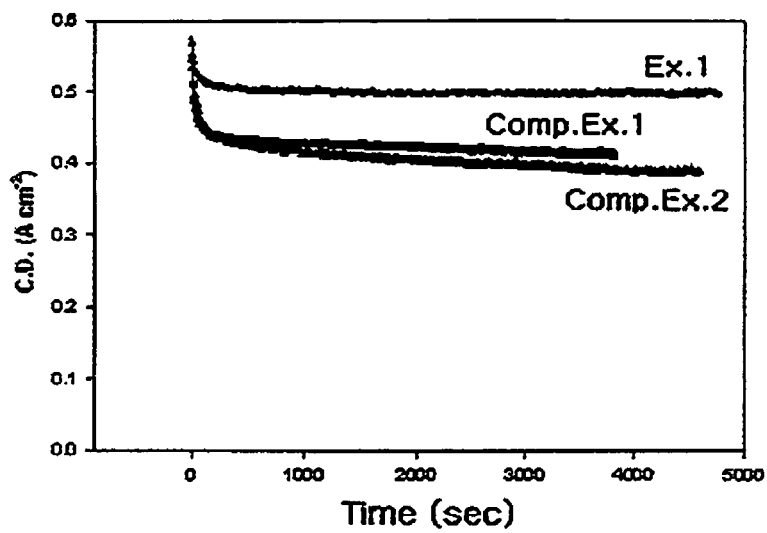
FIG. 1 is a graph showing the test results for the quality of fuel cells that comprise the electrode catalysts according to Example 1, Comparative Example 1 and Comparative Example 2.

Therefore, the present invention has been made in view of the above-mentioned problems. The present inventors have found that when a support with a large surface area (for example, a surface area of 1200 $m^2/g$ or more) is used to prepare an electrode catalyst via the precipitation method, platinum as a catalytic substance is highly dispersed on the support, the size of the supported platinum particles or platinum-containing alloy particles decreases uniformly to a nano-scaled size, thereby increasing the surface area of platinum particles that can participate in reactions on the support, resulting in maximization of the active region of the catalyst and improvement of the quality of a fuel cell.

Therefore, it is an object of the present invention to provide an electrode catalyst comprising a catalytic substance highly dispersed on a support and thus having a maximized catalytically active region, a membrane electrode assembly comprising the electrode catalyst, and a fuel cell that comprises the membrane electrode assembly and thus has improved quality.

According to an aspect of the present invention, there is provided an electrode catalyst comprising: (a) a support with a specific surface area of 1200 m²/g or more; and (b) platinum or platinum-containing alloy particles supported on the support, wherein the platinum is supported on the electrode catalyst in an amount of 56~90 wt % based on the total weight of the electrode catalyst. There are also provided a membrane electrode assembly (MEA) and a fuel cell comprising the same.

According to another aspect of the present invention, there is provided a method for preparing an electrode catalyst comprising platinum supported thereon in an amount of 56~90 wt % based on the total weight of the electrode catalyst, the method including the steps of: (a) dispersing a support with a specific surface area of 1200 m²/g or more into a solvent to form a support dispersion, and adding a pH modifier thereto to provide an alkalified support dispersion; (b) adding a platinum precursor or platinum-containing alloy precursor compound and a pH modifier to the dispersion obtained from step (a), and further adding a reducing agent thereto to perform reaction of the mixture; and (c) drying the powder obtained from step (b).

According to still another aspect of the present invention, there is provided a method for preparing an electrode catalyst with a particle size of 3.5 mm or less by controlling the amount of platinum theoretically on a support with a specific surface area of 1200 m²/g or more to an amount of 60 wt % or more.

Hereinafter, the present invention will be explained in more detail.

The present invention provides an electrode catalyst, for example platinum/or platinum-containing alloy/support particle, which comprises a catalytic substance capable of participating in catalytic reactions, highly dispersed on a support, and has a maximized surface area of the particles containing the catalytic substance, so as to maximize the active region of the catalyst.

Platinized carbon (Pt/C) comprising carbon powder, on which platinum is supported, used as a material for a catalyst layer in a gas diffusion electrode for a fuel cell, serves to extend the reactive region of the fuel introduced to the fuel cell, thereby allowing oxidation and reduction of reaction gases, such as hydrogen and oxygen, to occur. However, as described above, conventional electrode catalysts permit the size of platinum particles loaded on a support to be reduced to a limited degree. This is because conventional electrode catalysts use a support with a specific surface area of 300 m²/g or less. Moreover, uniform dispersion of platinum particles cannot be obtained from conventional electrode catalysts, and thus improvement in the quality of a fuel cell cannot be accomplished. Even in the case of a support with a specific surface area of 900~1200 m²/g, the amount of platinum on the support is 55 wt % or less based on the total weight of the catalyst. Therefore, it is not possible to provide a catalyst with an extended active region according to the prior art.

On the contrary, according to the present invention, it is possible to cause platinum particles as a catalytic substance to be highly dispersed and loaded on a support to an amount of 56~90 wt %, and to decrease the size of the supported platinum particles to a nano-scaled size. Therefore, it is possible to provide a catalyst having a significantly increased surface area of platinum particles that can participate in the reaction on a support, and thus to contribute to maximization of the catalytically active region and improvement of the quality of a fuel cell. Additionally, according to the present invention, a cost-efficient electrode catalyst can be provided using a reduced amount of platinum due to such an increased catalytically active region and increased electrical activity. Additionally, the electrode catalyst according to the present invention can reduce the thickness of a conventional electrode and can reduce the resistance against mass transfer, thereby improving the quality of a fuel cell.

In addition to the use of a support with a large specific surface area, according to the present invention, it is also possible to obtain a catalyst with a uniform nano-scaled size by adding a catalyst-containing solution in portions to a support dispersion during the preparation of a highly supported and dispersed electrode catalyst via the precipitation method in order to control the reaction rate. Such portionwise addition of the catalyst-containing solution prevents the resultant catalyst-containing compound from being formed all at once and from agglomerating rapidly.

There is no particular limitation in the support used for the catalytic supporting substance for the inventive electrode catalyst that has a maximized catalytically active region, as long as it is a porous material with a surface area of 1200 m²/g or more. This is because platinum particles or platinum-containing alloy particles should be dispersed and loaded uniformly on the support using the greater amount as possible, in order to extend the catalytically active region, as well as to control the size of the platinum particles or platinum-containing alloy particles to a nano-scaled size with ease.

The support that may be used in the present invention includes catalyst support s generally known to one skilled in the art, such as porous carbon, conductive polymer, conductive porous metal oxides, or the like. Non-limiting examples of the porous carbon include active carbon, carbon black, carbon fiber or carbon nanotube, or the like. Non-limiting examples of the conductive polymer include polyvinyl carbazole, polyaniline, polypyrrole, or derivatives thereof. Additionally, non-limiting examples of the metal oxides include at least one metal oxide selected from the group consisting of oxides of tungsten, titanium, nickel, ruthenium, tin, indium, antimony, tantalum or cobalt. Among these, porous carbon is particularly preferred. Also, there is no particular limitation in the size, porosity and pore size of the support, and such parameters can be controlled in a conventional manner.

Preferably, the catalytic substance on a support in the electrode catalyst that has a maximized catalytically active region according to the present invention is platinum or platinum-containing alloy, which is applicable to an anode as well as a cathode.

More particularly, there is no particular limitation in the metal contained in the platinum-containing alloy, as long as it is capable of forming alloy with platinum. Preferably, the metal is a transition metal such as ruthenium (Ru), palladium (Pd), gold (Au), silver (Ag), iridium (Ir), rhodium (Rh) or osmium (Os).

Although there is no particular limitation in the shape of the platinum or platinum-containing alloy, platinum or platinum-containing alloy is generally used in the form of particles. The particles have a size of 3.5 nm or less, preferably of 1.0~3.5 nm. If the particle size is less than 1.0 nm, crystals of the platinum particles become amorphous, and thus have very low activity per unit surface area. Moreover, even if the surface area increases due to such small particle size, the overall catalytic activity decreases. Additionally, when a membrane electrode assembly is formed using such particles and a single cell is operated, the metal particles agglomerates with ease, so that the service life is shortened. On the other hand, when the particle size is greater than 3.5 nm, the particle surface shows improved crystallinity, and the activity per unit surface area increases and is saturated at a certain level. However, the efficient surface area decreases due to the increased particle size, resulting in degradation of the overall catalytic activity.

The platinum particles or platinum-containing alloy particles are supported on the electrode catalyst suitably in an amount of 56~90 wt % Pt based on the total weight of the electrode catalyst. When the amount of platinum based on the total weight of the electrode catalyst is less than 56 wt %, active region of the electrode catalyst cannot be increased sufficiently, resulting in insufficient quality of the electrode catalyst. When the amount of platinum is greater than 90 wt %, agglomeration of metal particles, i.e. a so-called coarsening phenomenon occurs, so that a catalyst comprising uniformly dispersed nano-sized metal particles cannot be formed.

Additionally, according to the present invention, when the amount of platinum on the support is controlled under the same specific surface area, it is possible to control the size of the platinum particles on the support with ease.

In fact, when the amount of platinum is controlled to 60 wt %, 70 wt %, 80 wt % and 90 wt %, based on the total weight of the electrode catalyst, in the presence of a support with a specific surface area of 1200 $m^2/g$ or more, the actual size of the platinum particles on the support is 1.6~2.2 nm, 1.8~2.4 nm, 2.2~2.8 nm and 3.0~3.5 nm, respectively. Additionally, it can be seen from the following Experimental Example that the theoretical amount of supported platinum has little difference to the actual amount of supported platinum in each case (56 wt %, 65 wt %, 75 wt % and 83 wt %).

Therefore, the electrode catalyst according to the present invention comprises platinum or platinum-containing alloy particles with a size of 3.5 nm or less, loaded on a support with a specific surface area of 1200 $m^2/g$ or more, wherein the amount of platinum on the support is at least 56 wt % based on the total weight of the electrode catalyst. In one preferred embodiment of the present invention, the electrode catalyst comprises platinum or platinum-containing alloy particles with a size of less than 3 nm (e.g., 1.5~2.9 nm), loaded on a support with a specific surface area of 1200 $m^2/g$ or more, wherein the amount of platinum on the support is at least 70 wt % based on the total weight of the electrode catalyst. In another preferred embodiment of the present invention, the electrode catalyst comprises platinum or platinum-containing alloy particles with a size of 3~3.5 nm, loaded on a support with a specific surface area of 1200 $m^2/g$ or more, wherein the amount of platinum on the support is at least 80 wt % based on the total weight of the electrode catalyst. However, the scope of the present invention is not limited to the above-mentioned combinations of the specific surface area of the support, the amount of the catalytic substance and the size of the catalyst particles.

Meanwhile, the electrode catalyst that has a maximized catalytically active region according to the present invention may be prepared by a conventional method currently used in the art (for example, the precipitation method). However, the scope of the present invention is not limited thereto.

A embodiment of the method for preparing the electrode catalyst according to the present invention, comprises the steps of: (a) dispersing a support with a specific surface area of 1200 $m^2/g$ or more into a solvent to form a support dispersion, and adding a pH modifier thereto in order to provide an alkalified support dispersion; (b) adding a platinum precursor or platinum-containing alloy precursor compound and a pH modifier to the dispersion obtained from step (a), and further adding a reducing agent thereto to perform reaction of the mixture; and (c) drying the powder obtained from step (b).

1) First, a support for loading platinum or platinum-containing particles is dispersed into a solvent to form a support dispersion, and a pH modifier is further added thereto to provide an alkalified support dispersion.

The support is the same as defined above. Although there is no particular limitation in the solvent, distilled water is preferably used.

Herein, the ratio of the solvent to the support is preferably 100:1 or less. The support is dispersed into the solvent according to methods generally known to one skilled in the art, for example by way of mechanical stirring or magnetic stirring, with no particular limitation.

Additionally, the temperature of the solution, in which the support is dispersed, is 50° C. or higher, preferably 80° C. or higher, and the support dispersion preferably has a pH of 8~11. To modify the pH, a pH modifier is added to the dispersion. Non-limiting examples of the pH modifier include basic compounds such as sodium carbonate, sodium hydroxide or aqueous ammonia. Preferably, such pH modifiers may be introduced into the dispersion in the form of an aqueous solvent. However, the scope of the present invention is not limited thereto.

2) Next, a platinum precursor or platinum-containing alloy precursor compound and a pH modifier are added to the support dispersion obtained as described above, and a reducing agent is further added thereto to cause the platinum or platinum-containing alloy particles to be precipitated uniformly on the support.

Although there is no particular limitation in the platinum precursor or the precursor containing a metal such as Ru, Pd, Au, Ag, Ir, Rh or Os present in the platinum-containing alloy, chlorides, nitrides or sulfates, containing the above metal elements alone or in combination, may be used. Particularly, $H_2PtCl_6$ is preferred as a platinum salt.

In order to control the amount of platinum or platinum-containing alloy on the support to 56~90 wt %, amount of the platinum precursor and/or platinum-containing alloy precursor, corresponding to the above range, is determined, and then the precursor is dissolved into distilled water to provide a platinum-containing solution. Herein, because the platinum precursor or platinum-containing alloy precursor is a chloride, nitride or sulfate, the resultant platinum-containing solution shows strong acidity corresponding to a pH of 1~3.

In order to add the platinum-containing solution and a pH modifier to the support dispersion obtained as described above, the following methods may be used: (1) the platinum-containing solution is added to the support dispersion, and then the pH modifier is added thereto to control the pH to an alkaline range; or (2) the platinum-containing solution is added to the support dispersion simultaneously with the pH modifier to control the pH to an alkaline range in a continuous manner.

Preferably, the platinum-containing solution and the pH modifier are added to the support dispersion separately or simultaneously, in a portionwise manner by using an amount of 1/N of the total amount of the platinum-containing solution and/or the pH modifier (1≤N<100, wherein N is an integer). More preferably, a half (½) of the total amount is added. Such portionwise addition minimizes rapid agglomeration of a platinum-containing compound, caused by the instant formation of the platinum-containing compound due to the single addition of the platinum-containing solution and the pH modifier. Therefore, it is possible to obtain a catalyst comprising fine platinum particles.

The strongly acidic platinum-containing solution is used in combination with the pH modifier to control the pH to a range of 8~11. This is because the reduction of the platinum or platinum-containing alloy particles can be facilitated, if the hydroxy groups (OH⁻) needed for the reduction (precipitation) of the platinum or platinum-containing alloy particles are controlled.

The addition of the platinum-containing solution and the pH modifier permits precipitation of platinum particles on the support. However, it is preferable to use a reducing agent to enhance the precipitation of platinum. As the reducing agent, conventional reducing agents known to one skilled in the art may be used. Non-limiting examples of the reducing agent include sodium borohydride (NaBH₄), hydrazine (N₂H₄), sodium thiosulfite, nitrohydrazine, sodium formate (HCOONa), formaldehyde, alcohol, or the like.

When the platinum-containing solution having a pH controlled as described above and the reducing agent are added dropwise to the preformed support dispersion, Pt ions are precipitated, while they are supported uniformly on the surface of the support (for example, carbon particles). Particularly, when formaldehyde is used as the reducing agent, Pt ions are reduced according to the following Reaction Scheme 1. More particularly, formaldehyde is oxidized via the reaction with hydroxy groups to generate electrons, and Pt ions acquire the electrons and are reduced into platinum.

[Reaction Scheme 1]

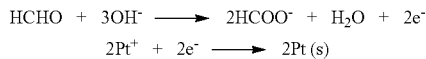

The platinum or platinum-containing alloy particles in the platinum or platinum-containing alloy/support, obtained as described above, have a particle size of 3.5 nm or less, and such particles are dispersed and loaded uniformly on the support in an amount of 56~90 wt %.

Meanwhile, in the case of a catalyst comprising 60 wt % or more of platinum supported thereon according to the prior art, the highly supported platinum particles agglomerate among themselves to cause the so-called coarsening phenomenon, thereby increasing the size of the platinum particles and reducing the reactive surface area of the catalyst, resulting in degradation of the catalyst quality. On the contrary, when the same support is used and the amount of platinum on the support is controlled to 60 wt % according to the present invention, the supported platinum particles have a size of 1.6~2.2 nm. Also, when the amount of the platinum particles on the support is controlled to 70 wt %, 80 wt % and 90 wt %, the platinum particles have a size of 1.8~2.4 nm, 2.2~2.8 nm and 3.0~3.5 nm, respectively. Therefore, according to the present invention, use of the support with a specific surface area of 1200 m²/g or more and portionwise addition of the platinum-containing solution and pH modifier, prevent the so-called coarsening phenomenon of platinum particles, and thus provide an increased number of nano-sized platinum particles. As a result, it is possible to increase the reactive surface area of the electrode catalyst and to improve the quality of the electrode catalyst, according to the present invention.

3) The particles obtained as described above were washed with distilled water and dried to provide a final electrode catalyst comprising particles of platinum or platinum-containing alloy on a support. If desired, a heat treatment step may be performed at a temperature of 150~600° C. under the atmosphere of nitrogen, air or hydrogen, so as to accomplish an adequate alloying degree.

The electrode catalyst comprising platinum or platinum-containing alloy/support particles according to the present invention may be used as an electrode catalyst for a fuel cell, and may be applied in an anode as well as a cathode.

Figure 2:
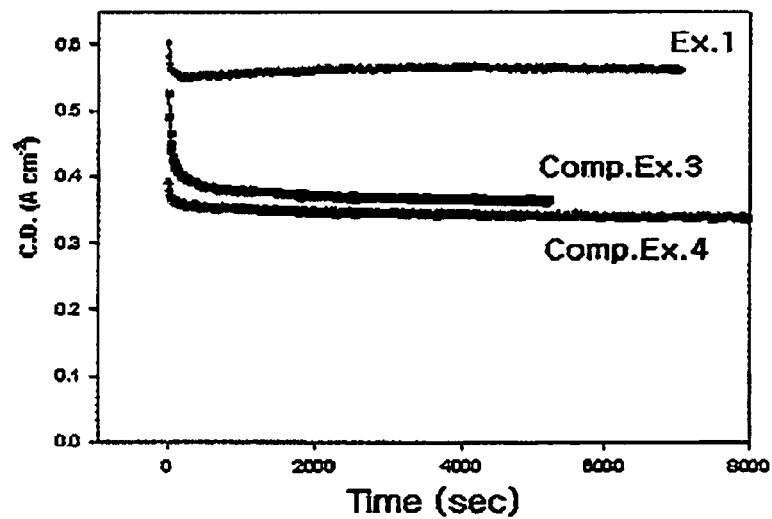
FIG. 2 is a graph showing the test results for the quality of fuel cells that comprise the electrode catalyst according to Example 1, and commercially available catalysts according to Comparative Example 3 and Comparative Example 4.
Figure 3:
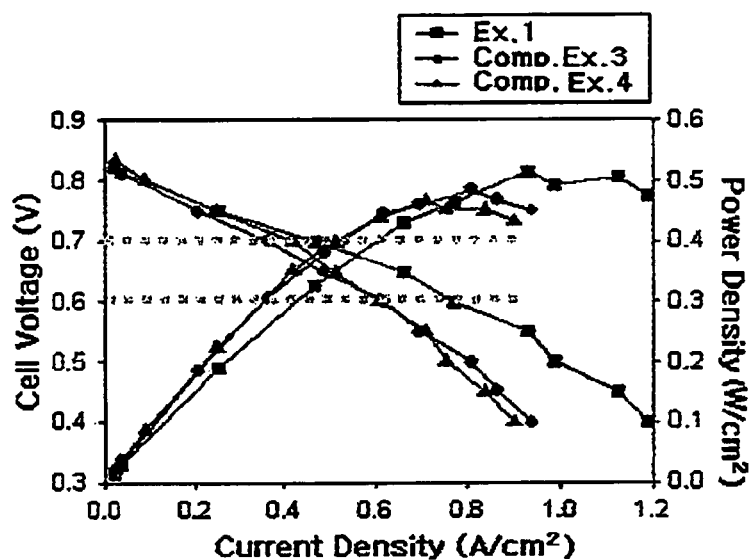
FIG. 3 is a graph showing the test results for the quality of fuel cells that comprise the electrode catalyst according to Example 1, and commercially available catalysts according to Comparative Example 3 and Comparative Example 4.

When the platinum or platinum-containing alloy particles with a particle site of 3.5 nm or less, highly loaded on a support with a specific surface area of 1200 m²/g or more, according to the present invention, is used as an electrode catalyst, the active region of the catalyst is maximized, resulting in improvements of the catalyst quality. In fact, when a membrane electrode assembly (MEA) is formed using the electrode catalyst and the MEA is subjected to a single cell test, the quality is significantly improved particularly at the cathode (see FIGS. 1-3).

According to another aspect of the present invention, there is provided an electrode for fuel cells, which comprises the electrode catalyst obtained as described.

The electrode for fuel cells comprises a gas diffusion layer and a catalyst layer. It may comprise a catalyst layer alone. Otherwise, it may have a catalyst layer integrally formed on a gas diffusion layer.

The electrode for fuel cells according to the present invention can be manufactured by a conventional method known to one skilled in the art. In one embodiment of the method, the electrode catalyst is mixed with catalyst ink that contains a highly proton conductive polymer material and a mixed solvent enhancing dispersion of the catalyst to provide slurry. Then, the slurry is applied on carbon paper by a printing, spraying, rolling or a brushing process, and then dried.

According to still another aspect of the present invention, there is provided a membrane electrode assembly (MEA) for fuel cells, which comprises: (a) a first electrode having a first catalyst layer; (b) a second electrode having a second catalyst layer; and (c) an electrolyte membrane interposed between the first electrode and the second electrode, wherein either or both of the first catalyst layer and the second catalyst layer comprise the electrode catalyst according to the present invention.

One of the first and the second electrodes is a cathode and the other is an anode.

The membrane electrode assembly refers to an assembly of an electrode for carrying out an electrochemical catalytic reaction between fuel and air with a polymer membrane for carrying out proton transfer. The membrane electrode assembly is a monolithic unit having a catalyst electrode adhered to an electrolyte membrane.

In the membrane electrode assembly, each of the catalyst layers of the anode and cathode is in contact with the electrolyte membrane. The MEA can be manufactured by a conventional method known to one skilled in the art. For example, the electrolyte membrane is disposed between the anode and cathode to form an assembly. Next, the assembly is inserted into the gap between two hot plates operated in a hydraulic manner while maintaining a temperature of about 140° C., and then pressurized to perform hot pressing.

There is no particular limitation in the electrolyte membrane, as long as it is a material having proton conductivity, mechanical strength sufficient to permit film formation and high electrochemical stability. The electrolyte membrane includes, but not exclusively, tetrafluoroethylene-co-fluorovinyl ether, wherein the fluorovinyl ether moiety serves to transfer protons.

According to yet another aspect of the present invention, there is provided a fuel cell comprising the above membrane electrode assembly.

The fuel cell may be a polymer electrolyte fuel cell or direct liquid fuel cell, whose cathodic reaction is oxygen reduction, but is not limited thereto. Particularly, a direct methanol fuel cell, direct formic acid fuel cell, direct ethanol fuel cell, direct dimethyl ether fuel cell, etc., are preferred. A phosphate electrolyte fuel cell may be also used.

All materials forming the fuel cell, other than the electrode catalyst according to the present invention, are those currently used in a conventional fuel cell. Also, there is no particular limitation in the method for manufacturing the fuel cell. The fuel cell may be manufactured by using the above membrane electrode assembly, which comprises a cathode, an anode and a membrane electrode assembly comprising an electrolyte coated with an active layer containing the electrode catalyst, and a bipolar plate in a conventional manner known to one skilled in the art.

Further, the present invention provides a method for preparing an electrode catalyst that comprises platinum particles on a support with a specific surface area of 1200 $m^2$/g or more, wherein the platinum particles have a particle size of 3.5 nm or less by controlling the theoretical amount of Pt on the support to 60 wt % or more.

BEST MODE FOR CARRYING OUT THE INVENTION

Reference will now be made in detail to the preferred embodiments of the present invention. It is to be understood that the following examples are illustrative only and the present invention is not limited thereto.

EXAMPLES 1-4

Preparation of Electrode Catalyst for Fuel Cell, and Manufacture of Membrane Electrode Assembly and Fuel Cell

Example 1

1-1. Preparation of Electrode Catalyst for Fuel Cell

First, 0.4 g of carbon black (KB600JD) with a surface area of 1200 $m^2$/g, used as a support, were introduced into 30 ml of distilled water, and stirred rigorously to obtain a colloidal solution. The colloidal solution was heated to 90° C. Then, 1M sodium carbonate solution was added to the colloidal solution to control the pH to a range of pH 8~9. After the pH value is stabilized, 4 ml of the aqueous solution containing 1.54 g of hexachloroplatinate ($H_2PtCl_6.xH_2O$), corresponding to the target amount (60 wt %) of platinum on the support, were added to the colloidal solution. Next, 1M sodium carbonate solution was added thereto, so that the pH value decreased by hexachloroplatinate was controlled back to a pH value of 8~9. To the resultant solution, formaldehyde solution was added to perform reduction of platinum in a liquid phase. Then, the solution was filtered, and the powder was washed and dried under vacuum at 80° C. to obtain platinum/carbon powder.

1-2. Manufacture of Membrane Electrode Assembly

The Pt catalyst obtained from Example 1-1 was diluted with isopropyl alcohol in a weight ratio of 1:100 to form a solution. Next, a Nafion solution was added to the solution and the catalyst was dispersed by mechanical stirring to form catalyst slurry. Then, a required amount of the catalyst was determined from the catalyst slurry, and was sprayed on a gas diffusion layer (GDL). Herein, the catalyst was introduced into an anode (Pt catalyst comprising 60 wt % of Pt supported on a support; HISPEC9100 available from Johnson Matthey Co.) and a cathode (the electrode catalyst according to Example 1-1), in an amount of 0.4 mg Pt/$cm^2$ and 0.2 mg Pt/$cm^2$, respectively, to determine the difference between the anode activity and the cathode activity. The anode, a polymer electrolyte membrane and the cathode were laminated and then pressed to form a membrane electrode assembly (MEA).

1-3. Manufacture of Fuel Cell

A single cell of a fuel cell was provided as described above and maintained at a temperature of 70° C. To the cathode, completely moistened air was supplied at 80° C. To the anode, completely moistened $H_2$ was supplied at 85° C. Then, current density generated by applying a constant voltage of 0.6V to the single cell was measured to evaluate the quality of the fuel cell.

Example 2

Pt/C powder was formed in the same manner as described in Example 1-1, except that 0.3 g of carbon black (KB600JD) as a support and 1.80 g of hexachloroplatinate ($H_2PtCl_6.xH_2O$) were used to provide a catalyst comprising 70 wt % of platinum supported thereon.

Example 3

Pt/C powder was formed in the same manner as described in Example 1-1, except that 0.2 g of carbon black (KB600JD) as a support and 2.06 g of hexachloroplatinate ($H_2PtCl_6.xH_2O$) were used to provide a catalyst comprising 80 wt % of platinum supported thereon.

Example 4

Pt/C powder was formed in the same manner as described in Example 1-1, except that 0.1 g of carbon black (KB600JD) as a support and 2.31 g of hexachloroplatinate ($H_2PtCl_6.xH_2O$) were used to provide a catalyst comprising 80 wt % of platinum supported thereon.

Comparative Examples 1-4

Preparation of Electrode Catalyst for Fuel Cell, and Manufacture of Membrane Electrode Assembly and Fuel Cell

Comparative Example 1

Example 1 was repeated to provide a catalyst comprising 60 wt % of platinum supported thereon, a cathode comprising the same catalyst and a single cell comprising the same cathode, except that the catalyst was prepared by using V72R with a surface area of 250 $m^2$/g instead of the carbon black (KB600JD) with a surface area of 1200 $m^2$/g, used as a support in Example 1-1.

Comparative Example 2

Example 1 was repeated to provide a catalyst comprising 60 wt % of platinum supported thereon, a cathode comprising the same catalyst and a single cell comprising the same cathode, except that the catalyst was prepared by using carbon black (KB300J) with a surface area of 800 $m^2$/g instead of the carbon black (KB600JD) with a surface area of 1200 m²/g, used as a support in Example 1-1.

Comparative Example 3

To provide a single cell for this Example, Example 1 was repeated, except that the cathode used in the single cell was manufactured by using a catalyst (HISPEC9100 available from Johnson Matthey Co.) comprising 60 wt % of platinum on a support with a specific surface area of about 700 m²/g instead of the electrode catalyst (KB600JD) according to Example 1.

Comparative Example 4

To provide a single cell for this Example, Example 1 was repeated, except that the cathode used in the single cell was manufactured by using a catalyst (TEC10E60E available from Tanaka Co.) comprising 60 wt % of platinum on a support with a specific surface area of about 700 m²/g instead of the electrode catalyst (KB600JD) according to Example 1.

Experimental Example 1

Analysis for Electrode Catalysts 1-1. Elemental Analysis

The catalysts according to Examples 1~4 were subjected to elemental analysis with an ICP instrument. After the analysis, it could be seen that the electrode catalysts according to Examples 1~4 comprises 56 wt %, 65 wt %, 75 wt % and 83 wt % of platinum, respectively, supported on carbon. Additionally, such experimental amounts of platinum show only a slight difference to the theoretical amounts (60 wt %, 70 wt %, 80 wt % and 90 wt %, respectively).

1-2. X-ray Diffraction Analysis (XRD)

Figure 4:
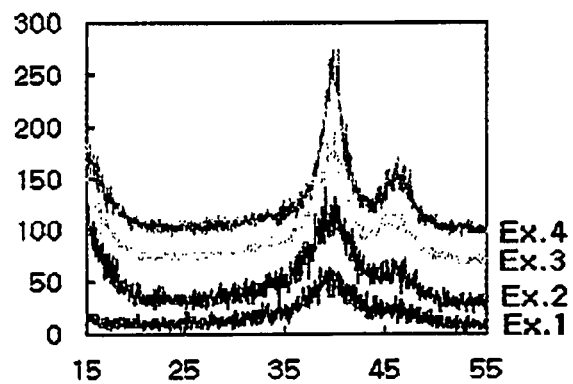
FIG. 4 is a graph showing the results of the X-ray diffraction analysis for the electrode catalysts according to Examples 1~4.

The electrode catalysts according to Examples 1~4 were analyzed by X-ray diffraction. After the analysis, it could be seen that the platinum particles on the carbon supports according to Examples 1~4 have a particle size of 1.6~2.2 nm, 1.8~2.4 nm, 2.2~2.8 nm, and 3.0~3.5 nm, respectively (see FIG. 4). Here, determination of each particle size based on the XRD data was made by the following Debye-Scherrer equation.

$t=0.9\, \lambda/B \cos \theta_B$ (wherein $t$ is a particle size, $\lambda$ is a Cu wavelength of XRD beams, and $2\theta$ is the angle of diffraction)

$B=HW/10\theta W$ (wherein $HW$ is a half maximum width, and $10\theta W$ is the width corresponding to a range of 10 degrees in the XRD graph) [Debye-Scherrer equation]

Experimental Example 2. Evaluation for Quality of Fuel Cells

The following test was performed to evaluate the quality of the fuel cell obtained by using the electrode catalyst according to the present invention.

2-1. Evaluation for Quality of Fuel Cells Using Supports with Different Surface Areas The single cell obtained by using the electrode catalyst comprising the carbon support (KB600JD) with a surface area of 1200 m²/g according to Example 1 was evaluated. As controls, the single cells comprising the electrode catalysts obtained by using the V72R support with a surface area of 250 m²/g according to Comparative Example 1, and the carbon support (KB300J) with a surface area of 800 m²/g according to Comparative Example 2, were used.

Each single cell was measured for the current density generated upon application of a constant voltage of 0.6V. FIG. 1 shows variations in the current density over time. To ensure the reproducibility, the test was repeated at least three times.

After the test, the electrode catalyst obtained by using the V72R support with a surface area of 250 m²/g according to Comparative Example 1, showed a current density of 0.40 A/cm² under 0.6V, and the electrode catalyst obtained by using the carbon support (KB300J) with a surface area of 800 m²/g according to Comparative Example 2, showed a current density of 0.43 A/cm² under 0.6V. On the contrary, the electrode catalyst obtained by using the carbon support (KB600JD) with a surface area of 1200 m²/g according to Example 1 showed a current density of 0.50 A/cm² under 0.6V. Therefore, it can be seen that the electrode catalyst according to the present invention can improve the quality of a fuel cell (see FIG. 1).

2-2. Evaluation for Quality of Inventive Fuel Cell Compared to Fuel Cells Using Conventional Electrode Catalysts The single cell obtained by using the electrode catalyst comprising the carbon support (KB600JD) with a surface area of 1200 m²/g according to Example 1 was evaluated. As controls, the single cells obtained by using the conventional electrode catalysts available from Johnson Matthey Co. and Tanaka Co., each comprising 60 wt % of platinum, according to Comparative Examples 3 and 4, were used.

Each single cell was measured for the current density generated upon application of a constant voltage of 0.6V. To ensure the reproducibility, the test was repeated at least three times.

After the test, the single cell obtained by using the electrode catalyst available from Johnson Matthey Co. according to Comparative Example 3, showed a current density of 0.38 A/cm² under 0.6V, and the single cell obtained by using the electrode catalyst available from Tanaka Co. according to Comparative Example 4, showed a current density of 0.34 A/cm² under 0.6V. On the contrary, the single cell obtained by using the electrode catalyst according to Example 1 showed a current density of 0.56 A/cm² under 0.6V. Therefore, it can be seen that the electrode catalyst according to the present invention can improve the quality of a fuel cell (see FIGS. 2 and 3).

As can be seen from the above test results, the electrode catalyst according to the present invention has a catalytically active region extended to the highest degree, and thus solves the problem of delayed oxygen reduction occurring in known cathodes, resulting in improvement of the quality of a fuel cell.

INDUSTRIAL APPLICABILITY

As can be seen from the foregoing, the electrode catalyst according to the present invention comprises 56 wt % or more of platinum or platinum-containing alloy particles, loaded on a support with a surface area of at least 1200 m²/g, wherein platinum particles have a fine and uniform particle size while maintaining their dispersibility. Therefore, the electrode catalyst according to the present invention has an extended catalytically active region, and thus can improve the overall quality of a fuel cell.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A method for preparing an electrode catalyst comprising 56-90 wt % of platinum supported thereon, which comprises the steps of:
    (a) dispersing a support into a solvent to form a support dispersion, and adding a first pH modifier thereto to provide an alkalified support dispersion;
    (b) adding a solution of a platinum precursor or platinum-containing alloy precursor compound and a second pH modifier to the alkalified support dispersion, and further adding a reducing agent thereto to perform reaction of the alkalified support dispersion to produce a platinum-containing dispersion; and
    (c) filtering the platinum-containing dispersion after step (b) to obtain a powder, and drying the powder,
    wherein pH of the alkalified support dispersion after the addition of the second pH modifier is 8-11, and
    wherein the solution is added portionwise in step (b) to the alkalified support dispersion, and an amount of each portion of the solution is 1/N of the total amount of the solution, where 1<N<100, and N is an integer, and wherein the portionwise addition minimizes rapid agglomeration of the platinum precursor or platinum-containing alloy precursor compound.

2. The method according to claim 1, wherein steps (a) and (b) are performed at a temperature of 50° C. or higher and 90° C. or less.

3. The method according to claim 1, wherein the support has a specific surface area of 1200 $m^2/g$ or more.

* * * * *